United States Patent [19]

Willey

[11] 4,082,345
[45] Apr. 4, 1978

[54] MOTORCYCLE WINDSHIELD ASSEMBLY

[76] Inventor: Barry A. Willey, 138 S. 8th Ave., Maywood, Ill. 60153

[21] Appl. No.: 685,707

[22] Filed: May 12, 1976

[51] Int. Cl.² ............................................. B62J 17/04
[52] U.S. Cl. ................................ 296/78.1; 280/289 S
[58] Field of Search ..................... 296/78.1; 280/289 S

[56] References Cited

U.S. PATENT DOCUMENTS

| 3,891,265 | 6/1975 | Blackburn | 280/289 S |
| 3,904,238 | 9/1975 | Anderson | 280/289 S |

FOREIGN PATENT DOCUMENTS 807,507   1/1959   United Kingdom ................ 296/78.1

*Primary Examiner*—Philip Goodman
*Attorney, Agent, or Firm*—James T. FitzGibbon

[57] ABSTRACT

A safety-type improved motorcyle windshield assembly is described. The windshield panel has lower, central, and upper portions, with at least the upper portion thereof being transparent. The lower portion of the windshield panel is attached to a first part of a motorcycle with which the shield is to be associated in use, and mounting rods attach a part of the windshield panel disposed above the lower portion of said panel to the same or to another part of the motorcycle which is fixed with respect to the first motorcycle part. The mounting rods each include an end portion disposed remotely of the windshield panel, an end portion disposed proximate to the windshield panel, and an intermediate portion extending between the end portions thereof. The proximate end portions include means attaching the windshield panel to the proximate end portions. The remote end portions are attached to the fixed motorcycle part, and the intermediate portions extend, in positions of use, upwardly and then forwardly from the remote end portions, with the proximate end portions and the attachment means terminating adjacent the windshield assembly panel and being free from end portions directed upwardly so as to lie in the path of a rider being thrown forward from said motorcycle and toward said windshield.

4 Claims, 5 Drawing Figures

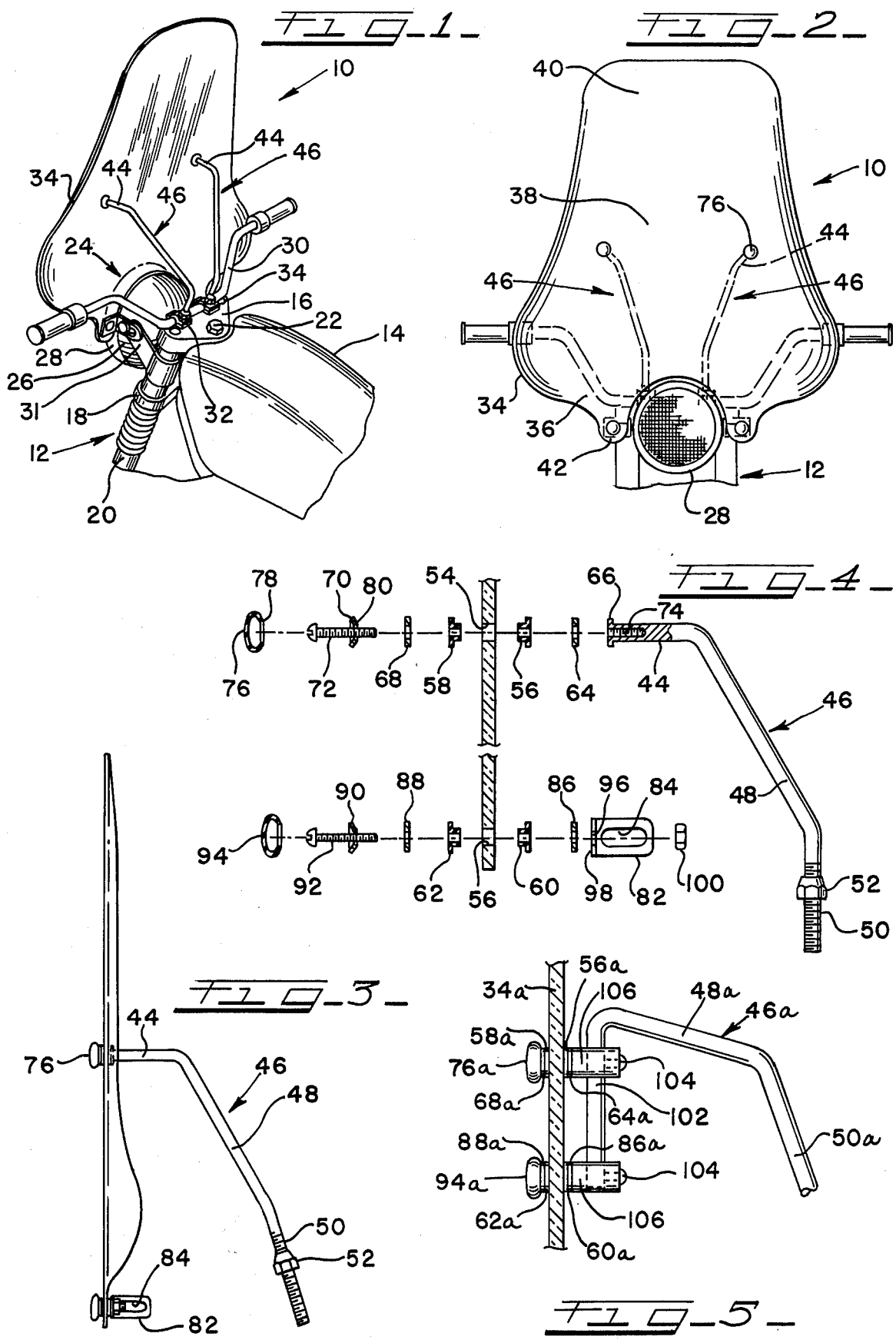

MOTORCYCLE WINDSHIELD ASSEMBLY

BACKGROUND OF THE INVENTION

The present invention relates generally to motorcycle windshields, and more particularly, to motorcycle windshields which are safer in use than prior art motorcycle windshields.

Whereas almost all motorcycles sold today in the United States do not come equipped at the point of sale with windshields, or combination windshields and so-called "fairings", a large number of motorcycle purchasers prefer to have some form of wind protection somewhat permanently affixed to their motorcycles. Riders of this type are ordinarily able to choose between so-called "fairings", which include a windshield as well as other components, such as headlights and directional signal housings, etc., and a simpler and less expensive form of protection against wind, wind-blown objects, and other debris, namely, a relatively simple form of windshield.

While certain fairings offer substantial protection and certain aerodynamic advantages, many fairings are quite heavy, very expensive, difficult to remove, and tend to shroud components to which access should be readily available for maintenance.

Accordingly, there is a substantial demand for windshields of a type which may be affixed relatively readily to a motorcycle, and which offer good protection against the wind and against flying objects of various kinds, including insects, rain drops, and wind-blown debris of various kinds.

The typical motorcycle windshield presents several square feet of surface area to the air stream, and, accordingly, it must be mounted quite firmly to withstand wind forces. For example, in the case of a motorcycle traveling at the present legal speed limit, or at former, higher speed limits (which may be reinstated) and into headwinds of 25 to 30 miles per hour or more, the shield must withstand wind velocities approaching 100 miles per hour. In order to be desirable, such a windshield must be free from visual obstruction throughout all or a significant part of its central and upper portions. In addition, a satisfactory windshield must be mounted in such a manner as to minimize transmission of shocks and vibration to the windshield panel itself. Fatigue cracks can result from the transmission of such shocks and vibration and these cracks can be propagated to other parts of the shield, rendering it worthless.

Recently, studies have been made of the effects of motorcycle accessories on victims of accidents. These studies, and other continuing studies, have shown that a number of accessories which are intended to increase rider safety sometimes actually create hazards which are more dangerous than those hazards which the accessories are intended to protect against. By way of example, bars attached to the frame and thought by some people to be helpful in avoiding leg injuries have, in certain types of accidents, tended to trap riders who would otherwise be thrown from the vehicle, thus injuring them severely. Other such devices have caused motorcycles, which might otherwise slide harmlessly along the road after falling down, to roll over, thus violently throwing the rider from the cycle or injuring him if he remains with the cycle.

While windshields offer an obvious safety advantage, insofar as they tend to provide improved visibility, and diminish the likelihood that foreign objects will strike the face or even the eyes of a rider, it has been discovered by tests, and confirmed in accident reports, that windshields and/or their attachments can create a significant hazard to a rider who is thrown forward into or against the shield. In most cases, while the shield itself, if properly designed, will be torn away or shatter without leaving sharp edges, the shield supports have presented a serious hazard to the rider in accident situations. Typically, where the cycle stops suddenly, as where it is struck head-on by another vehicle, or when the cycle hits a fixed or slower moving object of much greater mass, the motorcycle stops or slows down suddenly, throwing the rider forward. In the case of accidents wherein the rider was thrown forward from motorcycles having windshields of the prior art type injuries to almost every forward-facing part of the body occurred.

The rider's head was sometimes thrown downwardly toward the upwardly extending ends of the windshield mounting, resulting in head or facial injury. Likewise, upwardly and rearwardly projecting ends of prior art windshield designs presented serious injury hazards to the chest, abdomen, etc. Quite commonly, these upwardly and rearwardly projecting windshield supports would engage the clothing of the rider or inflict a scraping or scratching type of wound, or both. In all such cases, the injuries to the rider were much more severe than they might have been in the absence of such upwardly projecting, or upwardly and rearwardly projecting, windshield supports.

In view of the dangerous characteristics of certain prior art motorcycle windshields and windshield support structures, it is an object of the present invention to provide improved motorcycle windshield assemblies.

Another object is to provide a windshield assembly for a motorcycle which does not present a hazard of upwardly extending end portions of windshield supports, or windshield support structures which extend both upwardly and rearwardly.

A further object is provide a motorcycle windshield which includes an improved structure for engaging the windshield itself.

Another object is to provide a motorcycle windshield having improved visibility as well as an improved support and mounting structure.

Still another object is to provide a motorcycle windshield wherein the mounting rods which extend above the profile of the fuel tank and steering crown are free from upwardly extending or upwardly and rearwardly extending projections.

A still further object is to provide a motorcycle windshield assembly wherein fasteners for attaching the shield to the rod extend axially into and terminate within an end portion of the support rod which is close to the windshield.

Another object is to provide a form of windshield support in which the portions of the support rod proximate to the windshield terminate in downwardly extending or downwardly and forwardly extending end portions instead of upturned end portions.

Another object is to provide a motorcycle windshield which includes a more reliable means of attaching the shield to the support rod and which is adapted to provide minimum stress concentration within the windshield.

Another object is to provide a motorcycle windshield which includes a strong and yet easily adjustable mounting system having one or more of the advantages referred to herein.

The foregoing and other objects and advantages are achieved in practice by providing a motorcycle windshield assembly which includes a windshield panel with a transparent portion, with the panel having means for attaching the lower portion thereof as well as the central or upper portion thereof to two or more relatively fixed portions of an associated motorcycle, and in which the center or upper portion is attached to the cycle by mounting rods having portions adjacent the windshield which are free from upturned ends, and which are therefore free of projections which are likely to injure a rider being thrown forward from the motorcycle and toward the windshield.

The exact manner in which these and other objects and advantages are achieved in practice will become more clearly apparent when reference is made to the following detailed description of the preferred embodiments of the invention set forth by way of example and shown in the accompanying drawings, in which like reference numbers indicate corresponding parts throughout.

BRIEF DESCRIPTION OF THE DRAWINGS

FIG. 1 is a perspective view of a portion of a motorcycle, showing the windshield of the invention associated therewith in a normal position of use;

FIG. 2 is a front elevational view of the windshield of the invention, showing it in a position of use;

FIG. 3 is an enlarged side elevational view, showing the windshield of the invention assembled but before installation thereof;

FIG. 4 is a further enlarged exploded view of the mounting elements used to secure the windshield panel to the shield mounting means, showing the elements in relation to a portion of the windshield panel; and FIG. 5 is an enlarged view, partly in elevation and partly in section, showing another embodiment of the motorcycle windshield assembly of the invention.

DESCRIPTION OF THE PREFERRED EMBODIMENTS OF THE INVENTION

While it will be understood that motorcycle windshields of the present invention may be affixed to motorcycles in various ways, a description of a form of the invention will be made in which the shield is attached to the steering crown and headlight portions respectively of a modern motorcycle of the type having a conventional steering head assembly and handlebars mounted thereto by a conventional clamping arrangement. It will also be understood that, while, for purposes of illustration, the shield is shown as extending substantially vertically in FIGS. 3–5, the shield is normally inclined somewhat so as to have the upper portion thereof set behind the forward portion, so that the shield as a whole typically slopes some 5° to 15° from the vertical.

Referring now to the drawings in greater detail, FIG. 1 shows a windshield assembly generally designated 10 to be in position of use attached to an associated motorcycle generally designated 12. The cycle is shown to include a fuel tank 14, an upper "triple clamp" or steering crown 16, a lower "triple clamp" or steering crown 18, a forwardly and downwardly extending left hand fork tube 20, and a fastener 22 attached to the upper end of a downwardly and forwardly extending steering stem (not shown).

As is known to those skilled in the art, the steering stem extends downwardly through a tube on the motorcycle frame and is journaled in bearings which permit the upper and lower steering crowns 16, 18 to swing through an arc which is generally, but not actually, horizontal. The fork tube 20 and its counterpart on the right hand side (not shown) together with the steering crowns 16, 18 and the steering stem, provide a front fork assembly on which the front wheel is mounted and which permits the front wheel to be steered.

A headlight assembly generally designated 24 includes an outer shell 26 and a front rim 28. The headlight is mounted with respect to the steering crown, thus insuring that the headlight will be pointed in the same direction as the motorcycle is being steered. For this purpose, a mounting bracket 31 extends between the outer shell 26 of the headlight 24 and an upper portion of the fork tube 20. A similar bracket (not shown) is provided for the right hand side of the cycle. A pair of handlebars 30 are supported above the upper fork crown 16 and are held in place by left and right hand handlebar clamps 32, 34. As is well known to those skilled in the art, these clamps 32, 34 are typically secured to the upper fork crown 16 by cap screws extending downwardly into the crowns. The handlebars 30 are thus clamped tightly with respect to the front fork assembly.

For purposes of clarity, the drawings do not show other conventional parts of a typical motorcycle, such as brake and clutch levers, directional signals, side reflectors, etc., all of which would normally be found on a typical cycle and which are fully compatible with the installation of the windshield assembly of the present invention.

Referring now to the windshield assembly 10, this unit is shown to include a windshield panel 34 having a lower portion 36, a central portion 38 and an upper portion 40. In the form shown, the lower portion 36 includes ears 42 for mounting the lower end of the shield, the central portion 38 receives the forward ends 44 of the mounting rods 46, and the upper portion 40 provides the primary forward viewing area. Where the windshield panel itself is of a different shape, such as of substantially reduced height, the relative proportions of the central and upper parts of the shield might be substantially different.

Referring now to FIGS. 3 and 4, each mounting rod 46 is shown to include a forward end portion 44, a central portion 48 and a lower or rear end portion 50. The lower end 50 is threaded so as to receive thereover a lock nut 52. In relation to the windshield panel, the upward or forward end 44 may be considered as the proximate end, and the lower or rearward end 50 as the remote end of the rod 46.

FIG. 4 shows that upper openings 54 and lower openings 56 are adapted to receive inner and outer half-bushings 56, 58 and 60, 62 respectively. The half-bushings 56–62 each include flanges and reduced diameter shank portions and are preferably made from an elastomeric material. Referring to the upper portion of FIG. 4, an inner washer 64 is disposed between the half-bushing 56 and a radial flange 66 on the proximate end 44 of the rod 46. An outside flat metal washer 68 is disposed between the outer half-bushing 68 and a dished washer 70, disposed over the shank portion of fastening means in the form of a machine screw 72. A threaded bore 74 in the end 44 of the rod 46 receives the shank of the fastener 72 when the entire upper mounting is completely assembled.

A rubber or plastic cap 76 extends over and covers the head of the fastener 72, while the inner flanges 78 of the cap 76 extend over the rear surface of the outer margins 80 of the dished washer 70. Accordingly, the upper mounting presents a neat, finished appearance and the fasteners and washers respectively are protected against scratching, etc. The bushings 56-62 protect the shield 34 from direct contact with metal, thus protecting the shield 34 from shock and vibration damage.

Referring now to the lower mounting, a lower clip 82 is shown to include an elongated slot 84 for reception of a bolt or stud extending outwardly from the headlight shell 26 in a manner well known in the motorcycle art. Such bolts or studs include those used to mount the headlight itself, or to mount headlight reflectors, or other parts.

The lower inside and outside flat washers 86, 88, the lower dished washer 90, the lower fastener 92 and the lower cover cap 94 are all similar to their counterparts used to mount the upper end portion 44 of the rod 46 to the shield 34. In the case of the lower mounting, however, the fastener 92 extends through a central opening 96 in a flange 98 on the clip 92. A nut 100 is secured over the inner end of the fastener 92 after the lower mounting parts just described are assembled from the form shown in FIG. 4 into that shown in FIG. 3. The elongated slot 84 permits longitudinal adjustment as well as the customary tilting of the windshield where it attaches to the headlight shell 26.

Referring now to installation of the windshield on the motorcycle, it will be assumed that the windshield is in kit form, disassembled as shown in FIG. 4. To install the shield, one bolt or cap screw is removed from each of the handlebar clamps 32, 34 which retain the handlebar secured over the upper fork crown 16. The lock nut 52 is backed off or placed in the uppermost position permitted by the threads on the remote end 50 of the rod 46. Then, the end 50 is placed in the tapped opening vacated by removal of the cap screw, and the rod 46 is turned or twisted until the end 50 is fully threaded into the tapped opening in the crown. This operation is the equivalent of removing and replacing the cap screw holding one of the caps 32 in place. Next, the main portion 48 of the rod 46 is positioned so as to face generally forward, so that the end 44 thereof is generally aligned with the intended position of the appropriate upper opening 54 in the center portion 38 of the windshield panel 34. Next, the washers, bushings, and fasteners shown in the upper portion of FIG. 4 are assembled and loosely secured in place. This is done with both left and right hand rods 46. Next the lock nut 52 may be tightened somewhat to hold the associated handlebar cap in the desired position over the handlebar center section. Then, the lower clip 82 is loosely mounted with respect to the headlight shell by a cap screw, stud, reflector, or other fastener forming a part of the motorcycle headlight assembly. The clip 82 is tilted so that the flange 98 lies parallel to the rear surface of the mounting ears 42 of the shield. Next, the washers, elastomeric bushings and fasteners shown in the lower part of FIG. 4 are assembled in the sequence illustrated. With all fasteners loosely engaged, final adjustments are then made and all of the fasteners are tightened securely. Normally, this inclines the upper portion 40 of the shield 34 to the rear of the lower portion 36 thereof. Consequently, forwardmost ends 44 of the rods 46 are disposed somewhat above and to the front of lower ends 50 of the rod, with the end 44 lying perpendicular to the shield panel 34. Last, the protective and decorative caps 76, 94 are snapped over the ends of the fasteners 72, 92 which retain the dished washers 70, 90 thus imparting a smooth finished appearance to the product.

In use, windshields made according to the invention are sturdy, reliable, and long lasting. The entire windshield, or at least the upper portion thereof is transparent. The windshield, either wholly or in part, may be tinted, if desired. In some cases, the lower portion of the shield may be less transparent, or altogether opaque.

It has been found that, in the event the rider is thrown forward toward the shield for any reason, with sufficient force to create a potential for injury, the provision of the forwardly or forwardly and only slighty upwardly extending end portions of the rods 46 eliminate the hazard of injuring the rider by penetrating his body, and/or by hooking onto his body or clothing. The rods may also tend to support the rider's body against being projected downwardly onto upwardly extending parts such as the instruments or the like, acting as a cushion in this respect. If the force is sufficient to shatter the shield or tear it forwardly from the mountings, the function of the rods in avoiding injury still remains. The arrangement of the upper fasteners in such a manner that the fastener enters the rod axially also insures that there will be no objects extending upwardly and serving as projections extending outwardly from the upper rods 46. Accordingly, the windshield assembly and mounting system provide a construction which is simpler, which is more stable, and which is free from separate mounting holders or hangers, adapters or the like. The construction affords maximum safety and minimum visual obstruction in use.

Referring now to another form of windshield construction which is also advantageous, FIG. 5 shows that a windshield 34a may be supported on rods 46a which utilize a downturned end portion 102 which is proximate to or adjacent the windshield panel 34a. In this construction, set screws 104 serve to lock small cylinders 106 to the ends 102 of the rod 46a. The cylinders 106 include tapped or threaded axially extending openings (not shown) similar to the counterpart opening 74 in the end portions 44 of the rods 46.

FIG. 5 shows that the mounting construction is similar to the mounting construction of FIG. 4, that is, caps 76a, 94a cover the fastener heads and flat washers 68a, 88a and bushings 58a, 62a are provided on the front of the shield while bushings 56a, 60a and flat washers 64a, 86a are provided on the rear side of the shield respectively. The lower end portion 50a may include a handlebar clamp of a known type, or, in the alternative, it may include a threaded section of the type shown in FIG. 4. The intermediate section of the center portion 48a of the rod 46a may lie generally parallel with the ground or extend slightly upwardly as it extends forwardly in position of use.

While the rods used in the form of mounting assembly shown in FIG. 5 lack axially disposed fastener-receiving openings, the design of FIG. 5 is still free of upturned end portions, and provides several advantages in use. This form of windshield assembly is commonly used with windshields which are mounted somewhat lower and do not have the height of windshields mounted as shown in FIGS. 1 and 2.

In the constructions just described, the mounting rods, clips, etc., were mounted on portions of the motorcycle which are moveable with respect to the motorcycle frame, but which turn as a unit and which are thus fixed with respect to one another. In the event that form some reason it is desired to mount the shield with respect to the frame, then mounting points are selected on the frame which likewise do not move with respect to one another.

In another form of windshield, the proximate ends 44 of the rods 46 are formed without the radial flange 66. In this case, the washers 64 are sized to provide substantial engagement between both the rod ends and the outer diameter of the bushings, thus insuring full support of the bushings.

In another modified form of the invention, the fasteners 72 may be made from nylon or other material which is stiff and yet substantially less strong than steel. In this construction, in the event of an accident tending to throw the rider forward, the heads of the nylon fasteners sheer off, permitting the windshield to release forwardly, further reducing the risk of injury to the rider.

It will thus be seen that the present invention provides a novel windshield assembly and mounting means therefor having a number of advantages and characteristics including those pointed out above and others which are inherent in the invention. A preferred embodiment of the invention having been described by way of illustration, it is anticipated that changes and modifications of the described windshield assembly will occur to those skilled in the art and that such changes and modifications may be made without departing from the spirit of the invention or the scope of the appended claims.

I claim:

1. A motorcycle safety windshield assembly for attachment to a motorcycle having a frame, a seat, a fuel tank, a steering crown pivotally attached to said frame, and handlebars with at least portions thereof extending upwardly from said steering crown, said windshield assembly being adapted to direct air around a motorcycle rider sitting erect on said seat, and further adapted to provide injury protection for said rider, said windshield assembly comprising, in combination, a windshield panel having an upper portions, a lower portion for disposition adjacent said steering crown, lower fastening means for attaching said lower portions of said windshield panel to a portion of said motorcycle which moves as said steering crown is moved, and means for attaching said upper portion windshield panel to another, spaced apart portion of said motorcycle which also moves as said steering crown moves, said means for attaching said upper windshield portion including a pair of rods with lower portions having fastening means thereon for attachment to said motorcycle in the vicinity of the handlebars thereof, said rod fastening means preventing fore-and-aft movement of said rods, said rods also having intermediate portions extending substantially upwardly and forwardly of said seat, said steering crown and said rod fastening means, said rods terminating in generally forwardly directed upper end portions which are disposed in use substantially above said motorcycle tank, crown, and handlebars, each of said upper end portions including an axially extending opening therein, windshield fastening means extending through said upper portion of said windshield panel, said windshield fastening means having portions extending into and being secured within said axially extending openings and fastening said upper windshield panel portion to said upper rod ends in substantially perpendicular relation thereto so as to support said upper windshield panel against rearward movement in response to wind forces, said rods being free from upwardly and rearwardly projecting portions lying about the level of said seat, tank, and handlebars.

2. A safety windshield assembly as defined in claim 1 wherein said means having portions extending into said axially extending openings comprise fasteners made from a thermoplastic matieral, thereby facilitating forwardly directed breakaway of said windshield when it is subjected to an impact from the rear thereof.

3. A safety windshield assembly as defined in claim 1 wherein said lower fastening means comprises a pair of clips having portions attached to said windshield and other portions attached to said motorcycle along an axis permitting said lower portion of said windshield to tilt forwardly about said axis and permits said windshield to pivot forwardly without breaking the connection between said clips and said windshield.

4. A safety windshield assembly as defined in claim 1 wherein said lower portions of said rods are threaded portions having locking nuts associated therewith, whereby said lower rod portions may be threadedly engaged with a portion of said steering crown to secure said rods in said upwardly and forwardly directed position for at least partially supporting a rider thrown downwardly thereagainst in the event of a collison.

* * * * *